US007608208B2

(12) United States Patent
Houben et al.

(10) Patent No.: US 7,608,208 B2
(45) Date of Patent: Oct. 27, 2009

(54) ADDITIVES FOR WATER FOR FIRE PROTECTION

(75) Inventors: Jochen Houben, Kempen (DE); Erich Küster, Krefeld (DE); Martin Tennie, Krefeld (DE)

(73) Assignee: Evonik Stockhausen GmbH, Krefeld (DE)

( * ) Notice: Subject to any disclaimer, the term of this patent is extended or adjusted under 35 U.S.C. 154(b) by 327 days.

(21) Appl. No.: 10/474,522

(22) PCT Filed: Feb. 8, 2002

(86) PCT No.: PCT/EP02/01296

§ 371 (c)(1), (2), (4) Date: Mar. 31, 2004

(87) PCT Pub. No.: WO02/083247

PCT Pub. Date: Oct. 24, 2002

(65) Prior Publication Data

US 2004/0211932 A1 Oct. 28, 2004

(30) Foreign Application Priority Data

Apr. 10, 2001 (DE) ................................ 101 18 020

(51) Int. Cl.
*C09K 21/14* (2006.01)
*C09K 21/06* (2006.01)
*A62D 1/00* (2006.01)
*A62C 2/06* (2006.01)
*A62C 39/00* (2006.01)

(52) U.S. Cl. ....................... 252/610; 252/601; 252/607; 252/611; 252/8.05; 252/2; 252/3; 106/18.11; 524/555; 524/458; 524/460; 524/832; 524/833; 524/166; 524/236; 524/599; 524/602; 169/45; 169/46; 169/47

(58) Field of Classification Search ................ 252/8.05, 252/610
See application file for complete search history.

(56) References Cited

U.S. PATENT DOCUMENTS 3,354,084 A 11/1967 Katzer
3,728,258 A 4/1973 Livingston
3,758,641 A 9/1973 Zweigle
3,780,006 A 12/1973 Zweigle
4,089,831 A 5/1978 Chambers
4,384,988 A 5/1983 Schoenholz et al.
4,459,396 A * 7/1984 Yamasaki et al. ........... 526/200
4,522,968 A 6/1985 Horacek
4,610,311 A 9/1986 Bronner et al.
4,617,359 A * 10/1986 Smith .......................... 526/93
4,624,320 A 11/1986 Romaine
4,727,097 A * 2/1988 Kobayashi et al. .......... 523/408
4,739,009 A * 4/1988 Heide et al. ................. 524/801
4,799,962 A 1/1989 Ahmed
4,920,202 A * 4/1990 Irie et al. .................... 528/500
4,929,717 A 5/1990 Chmelir
4,942,189 A 7/1990 Peiffer et al.
4,978,460 A 12/1990 Von Blucher et al.
4,990,608 A 2/1991 Zapico
5,001,231 A 3/1991 Zapico
5,075,344 A 12/1991 Johnson
5,114,484 A 5/1992 Lynch
5,114,485 A 5/1992 Lynch et al.
5,126,390 A 6/1992 Duff
H1077 H 7/1992 Peiffer et al.
5,180,804 A * 1/1993 Niessner et al. ............. 528/500
5,190,110 A 3/1993 Von Blucher et al.
5,199,980 A 4/1993 Lynch et al.
5,210,298 A 5/1993 Shimomura et al.
5,229,488 A 7/1993 Nagasuna et al.
5,258,069 A 11/1993 Knechtel et al.
5,274,018 A 12/1993 Tanaka et al.
5,314,535 A 5/1994 Lynch et al.
5,318,619 A 6/1994 Lynch et al.
5,334,243 A 8/1994 Hyman
5,362,312 A 11/1994 Skaggs et al.
5,437,719 A 8/1995 Lynch et al.
5,480,480 A 1/1996 Lynch et al.
5,487,777 A 1/1996 Lundan et al.
5,504,123 A 4/1996 Partan, III
5,583,214 A 12/1996 Partain, III
5,616,273 A 4/1997 Clark et al.
5,629,377 A 5/1997 Burgert et al.
5,663,122 A 9/1997 Mueller et al.
5,684,107 A * 11/1997 Schneider et al. ........ 526/303.1
5,696,228 A 12/1997 Coville (Continued)

FOREIGN PATENT DOCUMENTS

DE 1201180 9/1965

(Continued)

OTHER PUBLICATIONS

German Search Report dated Aug. 8, 2001 based on DE 10118 020.

(Continued)

*Primary Examiner*—Joseph D Anthony
(74) *Attorney, Agent, or Firm*—Smith Moore Leatherwood LLP

(57) ABSTRACT

The current invention relates to water-swellable polymers at least partially comprised of sulfonic acid group containing monomers as additives for fire extinguishing water, which exhibits an elevated NaCl content, used in fire prevention and to combat fire.

69 Claims, No Drawings

U.S. PATENT DOCUMENTS

| | | | | |
|---|---|---|---|---|
| 5,785,747 | A | 7/1998 | Vollmer et al. | |
| 5,792,366 | A | 8/1998 | Coville | |
| 5,840,804 | A | 11/1998 | Carl et al. | |
| 5,843,320 | A | 12/1998 | Huang et al. | |
| 5,849,210 | A | 12/1998 | Pascente et al. | |
| 5,866,678 | A | 2/1999 | Kajikawa et al. | |
| 5,908,886 | A | 6/1999 | Uchida et al. | |
| 5,919,854 | A | 7/1999 | Huang et al. | |
| 5,932,193 | A | 8/1999 | Lopez et al. | |
| 5,969,012 | A | 10/1999 | Harris, Jr. | |
| 5,985,801 | A | 11/1999 | Hoff | |
| 5,985,992 | A | 11/1999 | Chen | |
| 5,989,446 | A | 11/1999 | Hicks et al. | |
| 6,001,920 | A | 12/1999 | Ghafoor et al. | |
| 6,031,037 | A | 2/2000 | Ghafoor et al. | |
| 6,080,704 | A | 6/2000 | Halliday et al. | |
| 6,093,769 | A | 7/2000 | Burdick et al. | |
| 6,100,222 | A | 8/2000 | Vollmer et al. | |
| 6,113,891 | A | 9/2000 | Burdick et al. | |
| 6,174,950 | B1 | 1/2001 | Nzudie et al. | |
| 6,207,796 | B1 | 3/2001 | Dairoku et al. | |
| 6,209,655 | B1 | 4/2001 | Valkanas | |
| 6,214,331 | B1 | 4/2001 | Vanderhoff et al. | |
| 6,225,395 | B1 | 5/2001 | Nzudie et al. | |
| 6,245,252 | B1 | 6/2001 | Hicks et al. | |
| 6,262,168 | B1 | 7/2001 | Huang et al. | |
| 6,372,901 | B1 | 4/2002 | Partain, III et al. | |
| 6,372,902 | B1 | 4/2002 | Partain, III et al. | |
| 6,388,000 | B1 | 5/2002 | Irie et al. | |
| 6,433,056 | B1 | 8/2002 | Burdick et al. | |
| 6,433,132 | B1 | 8/2002 | Wood et al. | |
| 6,454,003 | B1 * | 9/2002 | Chang et al. | 166/270 |
| 6,479,573 | B2 | 11/2002 | Burdick et al. | |
| 6,489,270 | B1 | 12/2002 | Vollmer et al. | |
| 6,514,418 | B1 | 2/2003 | Bartscherer et al. | |
| 6,544,503 | B1 | 4/2003 | Vanderhoff et al. | |
| 6,608,124 | B1 | 8/2003 | Huang et al. | |
| 6,632,779 | B1 | 10/2003 | Vollmer et al. | |
| 6,635,604 | B1 | 10/2003 | Halliday et al. | |
| 6,641,624 | B1 | 11/2003 | Govoni et al. | |
| 6,664,326 | B1 | 12/2003 | Huang et al. | |
| 6,670,508 | B2 | 12/2003 | Riondel | |
| 6,702,946 | B1 | 3/2004 | Huang et al. | |
| 6,712,897 | B2 | 3/2004 | Ayambem et al. | |
| 6,750,276 | B2 | 6/2004 | Ruggiero et al. | |
| 6,818,597 | B2 | 11/2004 | Harris | |
| 6,936,278 | B2 | 8/2005 | Reslow et al. | |
| 6,962,953 | B2 | 11/2005 | Probst et al. | |
| 6,964,691 | B1 | 11/2005 | Govoni et al. | |
| 7,179,862 | B2 * | 2/2007 | Mertens et al. | 525/221 |
| 7,189,337 | B2 * | 3/2007 | Sortwell | 252/8.05 |
| 2002/0193545 | A1 | 12/2002 | Riondel | |
| 2003/0031774 | A1 | 2/2003 | Frith et al. | |
| 2003/0180371 | A1 | 9/2003 | Reslow et al. | |
| 2004/0006175 | A1 | 1/2004 | Diener | |
| 2004/0014901 | A1 * | 1/2004 | Heide et al. | 525/330.3 |
| 2004/0034145 | A1 | 2/2004 | Fischer et al. | |
| 2004/0046158 | A1 | 3/2004 | Huebner | |
| 2004/0090625 | A1 | 5/2004 | Fischer et al. | |
| 2004/0131521 | A1 | 7/2004 | Kuboth | |
| 2004/0211932 | A1 | 10/2004 | Houben et al. | |
| 2004/0225051 | A1 | 11/2004 | Moy | |
| 2004/0258753 | A1 | 12/2004 | Demeester et al. | |
| 2005/0039253 | A1 | 2/2005 | Yang et al. | |
| 2005/0084469 | A1 | 4/2005 | Wood et al. | |
| 2005/0238716 | A1 | 10/2005 | Verrijk et al. | |
| 2005/0242045 | A1 | 11/2005 | Steiner et al. | |

FOREIGN PATENT DOCUMENTS

| | | | |
|---|---|---|---|
| DE | 2202505 | A | 8/1972 |
| DE | 2612846 | | 10/1976 |
| DE | 2647078 | A | 5/1977 |
| DE | 2924663 | | 12/1979 |
| DE | 3114630 | A1 | 4/1982 |
| DE | 3515865 | A1 | 11/1986 |
| DE | 3716304 | A | 11/1988 |
| DE | 3814751 | A1 | 11/1989 |
| DE | 4224537 | A1 | 2/1994 |
| DE | 69606148 | T2 | 5/2000 |
| DE | 10041394 | A1 | 3/2002 |
| DE | 10041395 | A1 | 3/2002 |
| EP | 0412363 | A2 | 2/1991 |
| EP | 0505163 | A1 | 9/1992 |
| EP | 0649669 | A | 4/1995 |
| EP | 0664302 | B1 | 7/1995 |
| EP | 0670333 | B1 | 9/1995 |
| EP | 0761701 | B1 | 3/1997 |
| EP | 0774279 | B1 | 5/1997 |
| GB | 289630 | | 5/1928 |
| JP | 53092598 | | 8/1978 |
| PL | 168763 | B1 | 4/1996 |
| PL | 362248 | | 10/2004 |
| RU | 2224160 | | 2/2004 |
| WO | 9219688 | | 11/1992 |
| WO | 9319135 | | 9/1993 |
| WO | 9422964 | | 10/1994 |
| WO | 9803228 | A | 1/1998 |
| WO | 9950308 | | 10/1999 |
| WO | 0215983 | | 2/2002 |
| WO | 2005074869 | | 8/2005 |
| WO | 2005092954 | | 10/2005 |
| WO | 2005100415 | | 10/2005 |

OTHER PUBLICATIONS

International Preliminary Examination Report completed on Jun. 24, 2003 in PCT/EP02/01296.

International Search Report completed on Sep. 19, 2002 in PCT/EP02/01296.

OECD Guideline 201 on "Alga, Growth Inhibition Test" adopted Jun. 7, 1984.

OECD Guideline 202, Part I, 24H EC50 Acute Immobilisation Test of OECD Guideline 202 on "Daphnia sp., Acute Immobilisation Test and Reproduction Test" adopted Apr. 4, 1984.

German Search Report dated Nov. 21, 2000 based on DE 10041394.3.

International Preliminary Examination Report completed on Nov. 21, 2002 in PCT/EP01/09768 & English Translation.

* cited by examiner

ADDITIVES FOR WATER FOR FIRE PROTECTION

FIELD OF THE INVENTION

The current invention relates to water swellable polymers, which are at least partially based on at least simple unsaturated sulfonic acid group containing monomers, as additives for fire extinguishing water, which exhibits an elevated NaCl content, used in fire prevention and to combat fire.

BACKGROUND OF THE INVENTION

For effective fire prevention and fire fighting, polymer additives with thickening properties are applied for increasing the viscosity of the fire extinguishing water in order to attain improved adhesion, as compared to just water, of the fire extinguishing medium to the surfaces, in particular on sloped surfaces.

Known from patent EP 0 774 279 B1 are viscosity increasing water additives which exhibit low moieties of acrylamido-propane sulfonic acid (AMPS). However, these polymers are not suitable for common salt containing aqueous solutions.

The U.S. Pat. No. 5,274,018 patent describes how soluble salts such as sodium chloride interfere with the swelling ability of polymers. Such interference frequently occurs when using water absorbing polymer gels in medical, chemical and agricultural applications. The swelling ability of the described polymer gels results from the electrostatic repulsion of the charges on the polymer chains and from the osmotic pressure of the counter ions. The swelling ability of such polymers is drastically reduced in a saline solution. Solute salts such as sodium chloride exert two types of effects on ionic polymer gels. They shield off the polymer charges and balance out the osmotic imbalance by the presence of counter ions inside and outside of the gel matrix. The loose ions thereby undesirably transform the ionic gel into a non-swellable, non-ionic gel. In this document, the problem of the saline content is solved by adding ionic surface active substances to the polymer surface. However, such surface active substances are unsuitable for industrial scale production and therefore do not qualify as volumetric goods for fire prevention and fire fighting.

SUMMARY OF THE INVENTION

The task of the current invention is therefore to identify water swellable polymers which can be used as additives for high saline content fire extinguishing water and that essentially maintain their swelling properties in saline water.

The task is solved in accordance with the invention by water swellable polymers, which are at least partially based on at least simple unsaturated sulfonic acid group containing monomers, as additives for common salt containing fire extinguishing water used in fire prevention and to combat fires.

In accordance with the invention, the use of water swellable polymers, which are at least partially based on at least simple unsaturated sulfonic acid group containing monomers, as additives for common salt containing fire extinguishing water, exhibiting at least 0.8 weight % or more in NaCl, surprisingly leads to a significant increase in the viscosity of the fire extinguishing medium in spite of the high saline content. The polymers used in accordance with the invention allow, for example, the use of sea water as a fire extinguishing water whose viscosity is increased by the polymers.

As salt containing fire extinguishing water in the sense of the invention, any aqueous liquid is to be understood which exhibits common salt (NaCl) as the largest saline moiety and which preferably exhibits a total salt content of 1 to 28 weight %, especially preferably exhibits 1 to 10 weight %, and quite especially, preferably exhibits 2 to 5 weight % in total saline content. Most preferred is salt containing water with a total saline content of 3 to 4 weight %. Most exceedingly preferred as a saline fire extinguishing water is sea water, as described for example in "Römps Chemical Lexicon" (volume 3, $8^{th}$ edition, p. 1596, 1983).

The polymers to be used in accordance with the invention are at least partially produced from at least one sulfonic acid group containing simple unsaturated monomer, preferably from aliphatic or aromatic vinyl sulfonic acids, especially preferred [are] allyl sulfonic acid, methallyl sulfonic acid, styrene sulfonic acid, acrylic sulfonic acid or methacrylic sulfonic acid, quite especially preferred [are] sulfoethyl acrylate, sulfoethyl methacrylate, sulfopropyl acrylate, sulfopropyl methacrylate, 2-hydroxy-3-methacryloxypropyl sulfonic acid and most preferred 2-acrylamido-propane sulfonic acid and/or a water soluble salt of the aforementioned compounds. The person skilled in the art will recognize that, according to the invention, a mixture of at least two of the above mentioned substances can also be applied.

Polymers, which are entirely or partially based on at least one, or based in particular on at least one of the above mentioned sulfonic acid group containing monomers are largely insensitive to salt in terms of their swelling properties in salt containing fire extinguishing water.

Preferably, the polymers to be used are comprised of at least 25 to 100 mole %, more preferably of 40 to 90 mole % and especially preferred, of 50 to 75 mole % of a sulfonic acid group containing monomer or of several sulfonic acid group containing monomers.

Equally preferred are polymers which contain sulfonic acid group containing monomers and non-ionic monomers as copolymers.

Such non-ionic monomers suitable for copolymerization are, for example, methacrylamide, N-alkyl substituted acrylamide, 2-hydroxyethyl acrylate, 2-hydroxyethyl methacrylate, hydroxy-propyl acrylate, hydroxypropyl methacrylate, $C_1$-$C_4$-alkyl(meth)acrylate, vinyl acetate and preferably acrylamide.

Preferably, the copolymers used in accordance with the invention contain 0 to 75 mole %, preferably 10 to 60 mole % and quite especially preferred, 25 to 50 mole % of a non-ionic monomer.

Other polymers can also possibly be added to the polymers to be used in accordance with the invention, so long as there remains a sufficient swelling capability in the salt containing water. Acrylic acid and other polymerizable carboxylic acids should not be added, or at least only in slight quantities, to the polymers to be used in accordance with the invention.

DETAILED DESCRIPTION

In a preferred embodiment of the current invention, the polymers are cross-linked. Suitable as cross linking agents are preferably all multifunctional cross-linking agents. Especially preferred are those cross-linking agents with at least two olefinic unsaturated double bonds.

Viable cross-linking agents along with their application are described, for example, in the document DE 100 41 394.3, in particular on page 5, in the before last paragraph, which is hereby introduced as a reference and is therefore to be considered as a part of the disclosure.

The degree of cross-linking quite substantially influences viscosity and thus, the adhesion properties of the resulting polymer.

Preferred compositions of the polymers to be used in accordance with the invention are comprised of at least A) 25 to 100 mole %, preferably 40 to 90 mole %, especially preferred 50 to 75 mole % of at least one sulfonic acid group containing monomer or of several sulfonic acid group containing monomers, B) possibly 0 to 75% mole %, preferably 10 to 60 mole %, especially preferred, 25 to 50 mole % of a non-ionic monomer, C) possibly 0.1 to 3 mole %, preferably 0.15 to 1 mole %, especially preferred, 0.2 to 0.5 mole % of a cross-linking agent, whereby the sum of A, B and C yields 100 mole %.

After polymerization, at least one residual monomer eradicator is preferably added to the polymers to be used in accordance with the invention.

Such an additive considerably enhances the environmental compatibility of the polymer additives used in fire extinguishing water applications.

Residual monomer eradicators, in the sense of the current invention, are substances that modify the polymerizable monomers by chemical reaction in such a manner that they are no longer polymerizable, so that they no longer represent monomers. To this end, substances can be used that react with the double bonds contained in the monomers and/or substances that can introduce further polymerization.

Residual monomer eradicators, in the sense of the current invention, are disclosed in detail in the German patent application DE 100 41 395.1, in particular on pages 6 through 7, which is hereby introduced as reference and is therefore to be considered as a part of the disclosure.

The polymers at least partially containing sulfonic acid groups are added to the saline fire extinguishing water preferably at a quantity of 0.25 to 10 weight %, more preferably at 0.5 to 5 weight %, especially preferred at a quantity of 1 to 3 weight % relative to the fire extinguishing water charged with polymer.

Preferably, the polymers to be used in accordance with the invention occur as water-in-oil polymer dispersion or as water-in-water polymer dispersion.

The additives in accordance with the invention are preferably used in the form of water-in-oil or water-in-water polymer dispersions which are added to the fire extinguishing water as the primary dispersion. The designated primary dispersions effect an acceleration of the intermixing and swelling processes in an advantageous manner.

Water-in-oil polymer dispersions in the sense of the current invention and processes for the production thereof are described in the patent EP 0 774 279 B1, for example on page 3, lines 3 through 55 and on pages 7 through 8, as well as in the German patent DE 100 41 395.1, for example on pages 3 through 5, which are hereby introduced as references and are therefore to be considered as an integral part of the disclosure.

Water-in-oil polymer dispersions are comprised of a continuous oil phase in which the particles of a largely cross-linked water swellable polymer are dispersed. The polymer particles normally exhibit particle sizes ranging from 0.1 to 10 μm, preferably smaller than 2 μm, which yield extremely brief swelling periods of less than 3 seconds.

These dispersions are preferably produced by reversed phase emulsion polymerization. By adding water-in-oil emulsifiers in a continuous, practically non-water-miscible organic phase, finely divided cross-linked, water swellable polymers are thereby produced. For the production of such polymers, the monomers from the organic phase are added as aqueous monomer solution, comprised of suitable monomers and preferably of at least one bifunctional cross-linking agent. In principle, all substances for reversed phase emulsion polymerization known to the person skilled in the art can be used as the organic phase. Such organic phases are specified, for example, in the German patent DE 100 41 395.1, page 4, last paragraph, which is hereby introduced as a reference and is therefore to be considered as an integral part of the disclosure.

Water-in-water polymer dispersions in the sense of the current invention and processes for the production thereof are described in the patents EP 670 333 B1, EP 761 701 B1 and in EP 664 302 B1 as well as in the German patent DE 100 41 394.3, which are hereby introduced as references and are therefore to be considered as an integral part of the disclosure.

In the case of water-in-water polymer dispersions, we are dealing with a class of products which is produced by polymerization in the liquid phase, for example, by emulsion or suspension polymerization. Hereby, monomers or a monomer solution are/is added to an aqueous phase containing at least one dispersing agent and the mixture resulting from this is polymerized. The particle size of the polymers from these primary dispersions lie in the range of 0.05 to 10 μm, preferably in the range of 0.5 to 5 μm, quite especially preferred, in the range of 0.5 to 2 μm. Dispersing agents and the application thereof are described, for example, in the first two paragraphs on page 6 of the German patent DE 100 41 394.3.

Water-in-water polymer dispersions for the prevention of fire have the advantage that such dispersions are ecologically superior on the one hand, and they exhibit less flammable components on the other.

Especially well suited are the water-in-oil and water-in-water polymer dispersions with polymer particles whose largest dimension amounts to less than 10 μm, preferably to less than 2 μm and especially preferred, to less than 1 μm.

The swelling period for such polymer dispersions to be used in accordance with the invention preferably amounts to no more than 3 minutes, especially preferred to no more than 30 seconds and quite especially preferred, to no more than 10 seconds.

These brief swelling periods make it possible for the polymer particles to have completely swelled up already prior to being dispensed with the standard fire fighting equipment onto the source of fire or onto the surfaces being primed for fire protection.

Such polymer dispersions are outstandingly suitable for applications in continuously mixing dispensing equipment for combating fire or for preventing it.

These polymers exhibit an improved environmental compatibility and can be produced, for example, by addition of the residual monomer eradicators after the completion of polymerization. Such polymers are especially suitable for fire extinguishing or fire preventative measures in the outdoors, that is, offset from areas set up with sewage lines or water storage reservoirs, such as for example in the case of forest, bush, island or ship fires.

Based on economic efficiency and logistics during the extinguishing process, the addition of the polymer to the extinguishing water, in accordance with the invention, makes it possible to attain a viscosity of at least 100 mPas for the extinguishing liquid. In practice, it has furthermore been shown to be advantageous to add the additives to the electrolyte containing extinguishing water at a quantity which is sufficient to boost the viscosity of the resulting fire extinguishing water—polymer mixture to over 1,000 mPas, measured according to Brookfield (1 UpM at 20° C.), or preferably to between 5,000 and 50,000 mPas.

In order to attain this level of viscosity, polymer dispersions are fed in with electrolyte containing water (fire extinguishing water), preferably at a concentration of 0.25 to 10 vol. %, more preferably at 0.5 to 5 vol. %, and especially preferred, at 1 to 3 vol. %, relative to the water admixed with the polymer.

The extinguishing water-additive mixtures to be used in accordance with the invention can be applied to the fire affected surfaces with any type of conventional fire fighting equipment. Such equipment is described, for example, in the patents EP 0 774 279 B1 and in the German patent DE 299 04 848 U1, which are hereby introduced as references and are therefore to be considered as part of the disclosure.

Mixing of the additive with the saline fire extinguishing water is preferably carried out continuously in a conventional fire fighting dispensing unit. In this manner, natural saline fire extinguishing water sources can be used such as brackish water or sea water, for example, in the case of fires aboard ships and on drilling platforms or in ports or along the coastlines and without any time delays.

The additive can be admixed batch-wise to the fire extinguishing water before it is applied via a dispensing unit, as previously described, onto a surface, preferably onto a vertical surface, a sloped or projecting surface for the prevention of fire and to combat fire.

In the following, the invention is detailed by way of examples. These examples merely serve to clarify the invention and do not limit the general purport of the inventive idea.

EXAMPLES

Comparative Examples

A 29 weight % solids containing water-in-oil polymer dispersion, in accordance with patent EP 774 279 B1, column 10, lines 26-28 [(polymer composed of sodium acrylate, sodium salt of acrylamido-propane sulfonic acid and acrylamide (molar ratio of 80/2.5/17.5)], with a mean particle size in the range of 0.1-10 μm, was mixed with sea water in a 5 and in a 10 weight % concentration, relative to the mixture, and the viscosity levels were determined for various shear rates with a Brookfield viscosity meter (at 20° C.):

| | | | |
|---|---|---|---|
| 1) 5% in sea water | | | |
| Viscosity | spindle I | 1 rpm | 20 mPas |
| | spindle I | 2.5 rpm | 12 mPas |
| | spindle I | 1/5.0 rpm | 10 mPas |
| | spindle I | 1/50.0 rpm | 21 mPas |
| 1) 10% in sea water | | | |
| Viscosity | spindle I | 1 rpm | 1,360 mPas |
| | spindle I | 2.5 rpm | 784 mPas |
| | spindle I | 5.0 rpm | 336 mPas |
| | spindle II | 50.0 rpm | 228 mPas |

Example 1

A 30 weight % solids containing water-in-oil polymer dispersion composed of 52 mole % acrylamido-propane sulfonic acid-sodium salt and of 48 mole % acrylamide, with a mean particle size in the range of 0.1-10 μm, was mixed with sea water in a 5 and in a 10 weight % concentration, relative to the mixture, and the viscosity levels were determined for various shear rates with a Brookfield viscosity meter (at 20° C.):

| | | | |
|---|---|---|---|
| 1) 5 weight % in sea water | | | |
| Viscosity | spindle I | 1 rpm | 2,960 mPas |
| | spindle I | 2.5 rpm | 2,190 mPas |
| | spindle I | 5.0 rpm | 1,720 mPas |
| | spindle III | 1/50 rpm | 760 mPas |
| 1) 10 weight % in sea water | | | |
| Viscosity | spindle III | 1 rpm | 53,600 mPas |
| Viscosity | spindle III | 2.5 rpm | 30,400 mPas |
| | spindle IV | 5 rpm | 20,000 mPas |
| | spindle IV | 50 rpm | 5,040 mPas |

Example 2

A 30 weight % solids containing water-in-oil polymer dispersion composed of 43 mole % acrylamide, 42 mole % acrylamido-propane sulfonic acid-sodium salt and of 15 mole % sodium vinyl sulfonate, with a mean particle size in the range of 0.1-10 μm, was mixed with sea water in a 5 and in a 10 weight % concentration, relative to the mixture, and the viscosity levels were determined for various shear rates with a Brookfield viscosity meter (at 20° C.):

| | | | |
|---|---|---|---|
| 1) 5 weight % in sea water | | | |
| Viscosity | spindle I | 1 rpm | 800 mPas |
| | spindle I | 2.5 rpm | 592 mPas |
| | spindle I | 5 rpm | 488 mPas |
| | spindle II | 50 rpm | 288 mPas |
| 2) 10 weight % in sea water | | | |
| Viscosity | spindle II | 1 rpm | 11,600 mPas |
| | spindle II | 2.5 rpm | 6,880 mPas |
| | spindle II | 5 rpm | 4,760 mPas |
| | spindle III | 50 rpm | 1,630 mPas. |

What is claimed is:

1. A method of using water-swellable polymers in fire prevention or fire fighting comprising:

(i) adding a salt containing water having common salt (NaCl) as the largest saline moiety and between about 2 and 28 weight-% total salt content and a quantity of an additive comprising a water-swellable polymer at least partially based on at least one sulfonic acid group containing unsaturated monomer to make a fire extinguishing water composition, the water-swellable polymer comprising at least:

(a) between about 50 and 70 mol-% of at least one sulfonic acid group containing monomer, (b) between about 10 and 60 mol-% of at least one nonionic monomer selected from any one of methacrylamide, n-alkyl-substituted acrylamide, 2-hydroxyethylacrlate, 2-hydroxyethylmethacrylate, hydroxypropylacrylate, hydroxypropylmethacrylate, $C_1$-$C_4$ alkyl(meth)acrylate, vinyl acetate, acrylamide, or combinations thereof, and (c) between about 0.1 to 3 mol-% of at least one cross-linking agent; and (ii) applying the fire extinguishing water composition to a surface for fire protection or fire fighting, wherein the quantity of the additive used in the fire extinguishing water composition is an amount that provides an amount of electrolyte sufficient to raise a viscosity of the fire extinguishing water composition to over about 1000 mPas.

2. The method according to claim 1, wherein the salt containing water comprises brackish water or sea water.

3. The method according to claim 1, wherein the salt containing water has between about 2 and 10 weight-% total salt content.

4. The method according to claim 3, wherein the salt containing water has between about 2 and 500 total salt content.

5. The method according to claim 1, wherein the at least one sulfonic acid group containing unsaturated monomer is selected from the group consisting of olefinic unsaturated monomers, water-soluble salts of olefinic unsaturated monomers, or combinations thereof.

6. The method according to claim 5, wherein the at least one sulfonic acid group containing unsaturated monomer is selected from the group consisting of aliphatic vinyl sulfonic acids, aromatic vinyl sulfonic acids, water-soluble salts of aliphatic vinyl sulfonic acids, water-soluble salts of aromatic vinyl sulfonic acids, or combinations thereof.

7. The method according to claim 6, wherein the at least one sulfonic acid group containing unsaturated monomer is selected from the group consisting of allyl sulfonic acid, methallyl sulfonic acid, styrene sulfonic acid, acryl sulfonic acid, methacryl sulfonic acid, water-soluble salts of allyl sulfonic acid, water-soluble salts of methallyl sulfonic acid, water-soluble salts of styrene sulfonic acid, water-soluble salts of acryl sulfonic acid, water-soluble salts of methacryl sulfonic acid, or combinations thereof.

8. The method according to claim 7, wherein the at least one sulfonic acid group containing unsaturated monomer is selected from the group consisting of sulfoethylacrylate, sulfoethylmethacrylate, sulfopropylacrylate, sulfopropylmethacrylate, 2-hydroxy-3-methacryloxypropylsulfonic acid, water-soluble salts of sulfoethylacrylate, water-soluble salts of sulfoethylmethacrylate, water-soluble salts of sulfopropylacrylate, water-soluble salts of sulfopropylmethacrylate, water-soluble salts of 2-hydroxy-3-methacryloxypropylsulfonic acid, or combinations thereof.

9. The method according to claim 8, wherein the at least one sulfonic acid group containing unsaturated monomer is selected from the group consisting of 2-acrylamidopropane sulfonic acid, a water-soluble salt of 2-acrylamidopropane sulfonic acid, or combinations thereof.

10. The method according to claim 1, wherein the at least one cross-linking agent is at least a multi-functional cross-linking agent.

11. The method according to claim 1, wherein the at least one cross-linking agent is at least a compound with at least two olefinic unsaturated double bonds.

12. The method according to claim 8, wherein the polymers are cross-linked with a cross-linking agent.

13. The method according to claim 12, wherein the cross-linking agent is at least a multi-functional cross-linking agent.

14. The method according to claim 13, wherein the cross linking agent is at least a compound with at least two olefinic unsaturated double bonds.

15. The method according to claim 1, wherein the at least one residual polymer eradicator is added to the water-swellable polymer after the polymerization.

16. The method according to claim 1, wherein the at least one sulfonic acid group containing monomer comprises several monomers containing sulfonic acid groups.

17. The method according to claim 1, wherein the water-swellable polymer comprises between about 25 and 50 mol-% of at least one nonionic monomer.

18. The method according to claim 1, wherein the water-swellable polymer comprises between about 0.15 and 1 mol-% of at least one cross-linking agent.

19. The method according to claim 1, wherein the water-swellable polymer comprises between about 0.2 and 0.5 mol-% of at least one cross-linking agent.

20. The method according to claim 1, wherein the water-swellable polymer comprises between about 0.25 and 10 weight-% of the fire extinguishing water composition.

21. The method according to claim 20, wherein the water-swellable polymer comprises between about 0.5 and 5 weight-% of the fire extinguishing water composition.

22. The method according to claim 21, wherein the water-swellable polymer comprises between about 1 and 3 weight-% of the fire extinguishing water composition.

23. The method according to claim 1, wherein the water-swellable polymer is present as a water-in-oil polymer dispersion.

24. The method according to claim 23, wherein the water-in-oil polymer dispersion is particles of the water-swellable polymer and a largest diameter of the particles is less than about 10 μm.

25. The method according to claim 24, wherein the largest diameter of the particles is less than about 2 μm.

26. The method according to claim 25, wherein the largest diameter of the particles is less than about 1 μm.

27. The method according to claim 23, wherein the water-swellable polymer has a swelling time of not more than about three minutes.

28. The method according to claim 27, wherein the swelling time is not more than about 30 seconds.

29. The method according to claim 28, wherein the swelling time is not more than about 10 seconds.

30. The method according to claim 1, wherein the water-swellable polymer is present as a water-in-water polymer dispersion.

31. The method according to claim 30, wherein the water-in-water polymer dispersion is particles of the water-swellable polymer and a largest diameter of the particles is less than about 10 μm.

32. The method according to claim 31, wherein the largest diameter of the particles is less than about 2 μm.

33. The method according to claim 32, wherein the largest diameter of the particles is less than about 1 μm.

34. The method according to claim 30, wherein the water-swellable polymer has a swelling time of not more than about three minutes.

35. The method according to claim 34, wherein the swelling time is not more than about 30 seconds.

36. The method according to claim 35, wherein the swelling time is not more than about 10 seconds.

37. The method according to claim 30, wherein the water-in-water polymer dispersion is in a concentration of between about 0.25 and 10 vol.-%.

38. The additive according to claim 37, wherein the water-in-water polymer dispersion is in a concentration of between about 0.5 and 5 vol.-% related to the water mixed with polymer.

39. The additive according to claim 38, wherein the water-in-water polymer dispersion is in a concentration of between about 1 and 3 vol.-%.

40. The method according to claim 1, wherein the water-swellable polymer has a swelling time of not more than about three minutes.

41. The method according to claim 40, wherein the swelling time is not more than about 30 seconds.

42. The method according to claim 1, wherein a quantity of the additive used in the fire extinguishing water composition is an amount that provides an amount of electrolyte sufficient to raise a viscosity of the fire extinguishing water composition to over about 5000 mPas.

43. The method according to claim 42, wherein the quantity of the additive used in the fire extinguishing water composition is an amount that provides an amount of electrolyte sufficient to raise the viscosity of the fire extinguishing water composition to over about 5000 and 50,000 mPas.

44. The method according to claim 1, wherein the additive and the water are continuously added as the fire extinguishing water composition is applied to a surface for fire protection or fire fighting.

45. The method according to claim 1, wherein the additive is provided to the water to make a batch of the fire extinguishing water composition prior to the batch being applied to a surface for fire protection or fire fighting using a discharging device.

46. An additive comprising a water-swellable polymer for making a fire extinguishing water based composition using a salt containing water having common salt (NaCl) as the largest saline moiety and between about 2 and 28 weight-% total salt content, the water-swellable polymer comprising:

(a) between about 50 and 70 mol-% of at least one unsaturated sulfonic acid group containing monomer;

(b) between about 25 and 60 mol-% of at least one nonionic monomer selected from any one of methacrylamide, n-alkyl-substituted acrylamide, 2-hydroxyethylacrlate, 2-hydroxyethyl methacrylate, hydroxypropylacrylate, hydroxypropylmethacrylate, $C_1$-$C_4$ alkyl(meth)acrylate, vinyl acetate, acrylamide, or combinations thereof; and (c) between about 0.1 to 3 mol-% of at least one cross-linking agent.

47. The additive according to claim 46, wherein the water-swellable polymer comprises between about 0.25 and 10 weight-% of the fire extinguishing water composition.

48. The additive according to claim 47, wherein the water-swellable polymer comprises between about 0.5 and 5 weight-% of the fire extinguishing water composition.

49. The additive according to claim 48, wherein the water-swellable polymer comprises between about 1 and 3 weight-% of the fire extinguishing water composition.

50. The additive according to claim 46, wherein the water-swellable polymer is present as a water-in-oil polymer dispersion.

51. The additive according to claim 50, wherein the water-in-oil polymer dispersion is particles of the water-swellable polymer and a largest diameter of the particles is less than about 10 μm.

52. The additive according to claim 51, wherein the largest diameter of the particles is less than about 2 μm.

53. The additive according to claim 52, wherein the largest diameter of the particles is less than about 1 μm.

54. The additive according to claim 50, wherein the swelling time is not more than about 10 seconds.

55. The additive according to claim 50, wherein the water-in-oil polymer dispersion is in a concentration of between about 0.25 and 10 vol.-%.

56. The additive according to claim 55, wherein the water-in-oil polymer dispersion is in a concentration of between about 0.5 and 5 vol.-% related to the water mixed with polymer.

57. The additive according to claim 56, wherein the water-in-oil polymer dispersion is in a concentration of between about 1 and 3 vol.-%.

58. The additive according to claim 46, wherein the water-swellable polymer is present as a water-in-water polymer dispersion.

59. The additive according to claim 58, wherein the water-in-water polymer dispersion is particles of the water-swellable polymer and a largest diameter of the particles is less than about 10 μm.

60. The additive according to claim 59, wherein the largest diameter of the particles is less than about 2 μm.

61. The additive according to claim 60, wherein the largest diameter of the particles is less than about 1 μm.

62. The additive according to claim 58, wherein the swelling time is not more than about 10 seconds.

63. The additive according to claim 46, wherein a quantity of the additive used in the fire extinguishing water composition is an amount that provides an amount of electrolyte sufficient to raise the viscosity of the fire extinguishing water composition to over about 1000 mPas.

64. The additive according to claim 63, wherein the quantity of the additive used in the fire extinguishing water composition is an amount that provides an amount of electrolyte sufficient to raise the viscosity of the fire extinguishing water composition to over about 5000 and 50,000 mPas.

65. The additive according to claim 46, wherein the additive and the water are capable of being continuously added as the fire extinguishing water composition is applied to a surface for fire protection or fire fighting.

66. The additive according to claim 46, wherein the additive is capable of being provided to the water so as to make a batch of the fire extinguishing water composition prior to the batch being applied to a surface for fire protection or fire fighting using a discharging device.

67. The additive according to claim 46, wherein the water-swellable polymer includes at least one residual polymer eradicator.

68. A fire extinguishing water based composition for use in fire prevention and fire fighting, the fire extinguishing water composition comprising:

(a) a salt containing water having common salt (NaCl) as the largest saline moiety and between about 2 and 28 weight-% total salt content; and (b) a dispersion of an additive comprising a water-swellable polymer, the water-swellable polymer comprising:

(i) between about 50 and 70 mol-% of at least one unsaturated sulfonic acid group containing monomer;

(ii) between about 25 and 60 mol-% of at least one nonionic monomer selected from any one of methacrylamide, n-alkyl-substituted acrylamide, 2-hydroxyethylacrlate, 2-hydroxyethyl methacrylate, hydroxypropylacrylate, hydroxypropylmethacrylate, $C_1$-$C_4$ alkyl(meth)acrylate, vinyl acetate, acrylamide, or combinations thereof; and (iii) between about 0.1 to 3 mol-% of at least one cross-linking agent, wherein a quantity of the additive used in the fire extinguishing water based composition is an amount that provides an amount of electrolyte sufficient to raise a viscosity of the fire extinguishing water based composition to over about 1000 mPas.

69. An additive for making a fire extinguishing water based composition using a salt containing water having common salt (NaCl) as the largest saline moiety and between about 2 and 28 weight-% total salt content, the additive comprising a water-in-oil polymer dispersion comprising:

(a) between about 50 and 70 mol-% of at least one unsaturated sulfonic acid group containing unsaturated monomer, wherein the at least one sulfonic acid group containing unsaturated monomer is selected from the group consisting of sulfoethylacrylate, sulfoethylmethacrylate, sulfopropylacrylate, sulfopropylmethacrylate, 2-hydroxy-3-methacryloxypropylsulfonic acid, water-soluble salts of sulfoethylacrylate, water-soluble salts of sulfoethylmethacrylate, water-soluble salts of sulfopropylacrylate, water-soluble salts of sulfopropylmethacrylate, water-soluble salts of 2-hydroxy-3-methacryloxypropylsulfonic acid, and combinations thereof;

(b) between about 25 and 60 mol-% of at least one nonionic monomer, wherein the at least one nonionic monomer is selected from the group consisting of methacrylamide, n-alkyl-substituted acrylamide, 2-hydroxyethylacrlate, 2-hydroxyethyl methacrylate, hydroxypropylacrylate, hydroxypropyl methacrylate, $C_1$-$C_4$ alkyl(meth)acrylate, vinyl acetate, acrylamide, and combinations thereof; and (c) between about 0.1 to 3 mol-% of at least one cross-linking agent, wherein the additive comprises a water-swellable polymer having a swelling time in said salt containing water of not more than about 30 seconds.

* * * * *

UNITED STATES PATENT AND TRADEMARK OFFICE

CERTIFICATE OF CORRECTION

PATENT NO. : 7,608,208 B2
APPLICATION NO. : 10/474522
DATED : October 27, 2009
INVENTOR(S) : Jochen Houben, Erich Küster and Martin Tennie It is certified that error appears in the above-identified patent and that said Letters Patent is hereby corrected as shown below:

Column 6,
Line 60, "droxyethylacrlate," should read -- droxyethylacrylate, --.

Column 7,
Line 12, "2 and 500" should read -- 2 and 5% --.

Column 8,
Line 58, "The additive according to claim 37" should read -- The method according to claim 37 --.

Line 62, "The additive according to claim 38" should read -- The method according to claim 38 --.

Column 9,
Line 31, "2-hydroxyethylacrlate," should read -- 2-hydroxyethylacrylate --.

Line 37, "linking agent" should read -- linking agent, wherein the additive comprises a water-swellable polymer having a swelling time in said salt containing water of not more than about 30 seconds. --.

Column 10,
Line 54, "droxyethylacrlate," should read -- droxyethylacrylate, --.

Column 12,
Line 5, "2-hydroxyethylacrlate," should read -- 2-hydroxyethylacrylate --.

Signed and Sealed this

Eighth Day of December, 2009

David J. Kappos

David J. Kappos
*Director of the United States Patent and Trademark Office*

UNITED STATES PATENT AND TRADEMARK OFFICE

CERTIFICATE OF CORRECTION

PATENT NO. : 7,608,208 B2
APPLICATION NO. : 10/474522
DATED : October 27, 2009
INVENTOR(S) : Houben et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 651 days.

Signed and Sealed this

Twelfth Day of October, 2010

David J. Kappos

*Director of the United States Patent and Trademark Office*